United States Patent

Woodings

[15] 3,661,714
[45] May 9, 1972

[54] PROCESS FOR PRODUCING ZEARALENONE

[72] Inventor: Eric T. Woodings, Terre Haute, Ind.

[73] Assignee: Commercial Solvents Corporation

[22] Filed: June 18, 1970

[21] Appl. No.: 47,639

[52] U.S. Cl. .................................195/36 R, 195/81, 195/115
[51] Int. Cl. ..........................................................C12d 13/00
[58] Field of Search....................195/36 R, 81, 115; 424/279

[56] References Cited

UNITED STATES PATENTS 3,196,019   7/1965   Andrews et al. ......................195/36 R Primary Examiner—Alvin E. Tanenholtz
Attorney—Behringer, Bernard, Brown, Dresser, Morton, Roberts & Sutherland

[57] ABSTRACT

The production of zearalenone in a submerged fermentation process employing submergible, zearalenone-producing strains of *Gibberella zeae* is enhanced by partial replacement of the fermentation medium.

13 Claims, No Drawings

PROCESS FOR PRODUCING ZEARALENONE

This invention relates to the production of zearalenone by the cultivation of submergible, aerobic zearalenone-producing strains of *Gibberella zeae* in a fermentation medium involving partial replacement of the fermentation medium used therein.

It has been discovered by Chester L. Keith, as disclosed in his application Ser. No. 47,637 filed June 18, 1970, that submergible, aerobic zearalenone-producing strains of the microorganism *Gibberella zeae* will efficiently produce zearalenone when cultivated by submersion in an agitated, aerated, aqueous, liquid phase fermentation medium containing assimilable carbon, nitrogen and mineral sources. The structural formula for zearalenone is as follows:

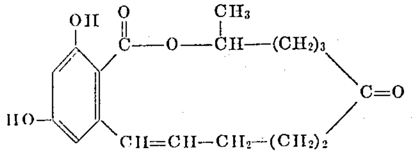

Prior to this discovery, attempts to produce zearalenone by submerged culture fermentation were decidedly unsuccessful. An advantage of employing the submerged culture technique, as compared, say, to static fermentation on a porous substrate, is that a simple, and therefore less expensive, process and recovery operation can be utilized to collect the zearalenone product.

It has now been found that the above-described, submerged culture fermentation process can be rendered more efficient and economical if it is conducted semi-continuously or continuously by periodically or constantly replacing a portion less than all of the spent, zearalenone-containing medium with fresh fermentation medium containing assimilable carbon, nitrogen and mineral sources, whereby the unreplaced spent medium serves as inoculum for the replacement medium.

Submergible, aerobic zearalenone-producing strains of *Gibberella zeae* types of cultures are on unrestricted deposit at the American Type Culture Collection (ATCC). They will efficiently produce zearalenone when cultivated by submersion in an agitated, aerated, aqueous, liquid phase fermentation medium containing nutrients including assimilable carbon, nitrogen and mineral sources. These strains include *Gibberella zeae* (Schw.) Petch strain 542 Keith ATCC 20273 and *Gibberella zeae* (Schw.) Petch strain Paul S. ATCC 20271. Preferably, distilled water, deionized water, or tap water which has been heated to boiling and then filtered is used in the medium. Aeration of the medium is preferably effected by bubbling air therethrough, preferably sterile air, and preferably at a rate of about 0.25 to 2 volumes of air, calculated at about atmospheric pressure, per volume of medium, per minute. The temperature of the medium is preferably maintained at about 20° to 28°, most preferably about 21° to 24° C. During the early stages of the fermentation, for example until zearalenone production has started, it is preferred not to allow the temperature to get much above 24° C. The medium is advantageously agitated to disperse and make air available to the microorganism and this can be effected by any suitable means, e.g., by a stirrer operating at about 200 to 500 r.p.m. in a 20 liter fermentor.

The assimilable carbon source in the fermentation media is advantageously glucose, e.g., reagent grade glucose. Cerelose, a white, crystallized, refined dextrose, is a suitable source of glucose for the process. Also suitable, but less preferred, carbon sources are other carbohydrates which will not deleteriously affect the production of zearalenone, such as xylose, fructose, sucrose, and galactose. Xylose performs better when used in admixture with glucose (for example, at a ratio of 7.5 parts by weight of xylose to 22.5 parts by weight of glucose) than when used as the sole carbon source. If desired, a portion of the glucose, when employed, say up to about 50 weight percent thereof, can be substituted with glycerol. As an alternative to supplying actual glucose to the fermentation medium, a precursor thereof, such as starch, which, under the conditions of the process, will be converted to glucose, can also be used. The amount of assimilable carbon source used in the initial fermentation medium is that which is sufficient for reduction by the microorganism to produce zearalenone and, for example in the case of glucose, will generally range from about 20 to about 40, preferably about 25 to 35, grams of glucose per 100 cc. of the medium.

While the amount of carbon source in the replacement medium will likewise be sufficient for reduction by the microorganism to produce zearalenone, it has been surprisingly found that lower carbon source, e.g., sugar, concentrations can be employed in the batches of replacement medium than is employed in the initial fermentation medium without substantially reducing the efficiency of the process. Thus, for example, glucose concentration in the replacement medium can range as low as about 10 grams per 100 cc. of medium instead of, for instance, 20 grams per 100 cc. of medium and up to about 30 grams per 100 cc. of medium. The carbon source concentration in the replacement medium, the amount of spent medium removed from the fermentation zone, and the amount of replacement medium added to the zone are all balanced so as to provide the zone's contents with sufficient carbon source, and other medium components as well, for continued production of zearalenone. In the preferred embodiment of the present invention wherein glucose is employed as the carbon source, it is preferred that these conditions be so balanced that the zone's contents, immediately after receiving a batch of replacement medium, contain about 1 to 20 grams of glucose per 100 cc. of medium.

The assimilable nitrogen source for the fermentation media can be either inorganic or organic, but preferably it is the latter. Ammonia-supplying, neutral compounds that are easily hydrolyzable are generally suitable. Examples of suitable nitrogen-supplying compounds are urea, asparagine, ammonium salts such as ammonium nitrate and ammonium fumarate, glutamine, glycine, ammonium hydroxide, and Sheffield's NZ Amine Type HD, a protein hydrolyzate. The preferred nitrogen source is urea, and this is generally employed in an amount in the range of about 0.2 to 0.8, preferably about 0.3 to 0.7, grams per 100 cc. of the fermentation medium.

The mineral sources included in the fermentation media as nutrients include the elements, iron, phosphorous, potassium, sulfur, and magnesium, preferably in water soluble form. The amounts of the various minerals can vary considerably although each should be present in an amount sufficient to insure proper growth of the microorganism. Generally effective amounts of each of these elements, calculated as the free element, range from about 0.001 to 1 gram per 100 cc. of the medium. Preferred sources of these elements include dipotassium phosphate (i.e., $K_2HPO_4$), magnesium sulfate (e.g., supplied as $MgSO_4 \cdot 7H_2O$), potassium chloride, and, as a source of iron, sulfur and phosphorus, the aforementioned NZ Amine Type A. The potassium chloride can also function in the medium as an osmotic pressure-enhancing salt, as is hereinafter discussed. The preferred amount of dipotassium phosphate employed is about 0.05 to 0.3 grams per 100 cc. of medium, and the preferred amount of magnesium sulfate (calculated as $MgSO_4 \cdot 7H_2O$) is about 0.025 to 0.2 grams per 100 cc. of medium. Iron is an especially desired ingredient of the medium when the carbon source is reagent grade glucose.

There is preferably included in the fermentation media used in the process yield-enhancing amounts of a protein hydrolyzate, e.g., an enzymatic hydrolyzate of protein, most preferably an enzymatic hydrolyzate of casein, such as Sheffield's NZ Amine Type A and Amber's ECH. The Sheffield N-Z-Amine Type A is a pancreatic hydrolysate of casein which contains, in the form of mixed amino acids and peptides, all amino acids originally present in casein. The hydrolyzate is preferably present in the medium in an amount of at least about 0.1 grams, say about 0.1 to 2 grams, per 100 cc. of the medium. The most preferred hydrolyzate is NZ Amine Type A. Less preferred, but operable, substitutes for the hydrolyzate are vitamin-free casein and casein itself. The use of an enzymatic hydrolyzate, for example NZ Amine Type A, has been indicated to be particularly useful where the carbon source employed is reagent grade dextrose.

There is also preferably included in the fermentation media an amount of yeast extract, e.g., Difco yeast extract (sometimes called Bacto yeast extract), sufficient to enhance the yield of zearalenone. Generally suitable amounts of yeast extract range from about 0.05 to 0.2 grams per 100 cc. of the fermentation medium. An analysis of the composition of the mineral elements contained in Difco yeast extract is described in *Journal of Bacteriology*, Vol. 84, p. 869 (1962), hereby incorporated by reference. Other operable substitutes for yeast extract in the medium are corn gluten meal, corn steep liquor, Pharmamedia (a cotton seed-derived protein nutrient), Fermamine IV (an enzymatic digest of proteins), BYF-300 (a fraction of autolyzed Brewers yeast), and Nutrisoy (a defatted edible soy flour), however, yeast extract is preferred.

Growth promoting amounts of animal amino acids, e.g., about 0.1 to 0.3 grams per 100 cc. of the medium, of beef extract such as Difco's beef extract, can also be included in the media.

A foam inhibitor, preferably one which will not deleteriously affect the production of zearalenone, is advantageously included in the fermentation media. Those which have been indicated to be the least deleterious, so far as zearalenone yields are concerned, are the silicone foam inhibitors, e.g., Antifoam 10 (a non-ionic silicone emulsion containing about 10 percent silicone solids, a General Electric Co. product). Others which are effective, but which reduce zearalenone yields somewhat, include corn oil, lard oil, mineral oil, and fatty alcohols such as lauryl alcohol.

An ismotic pressure-enhancing salt can also be included in the fermentation media. Examples of such are the alkali metal salts, e.g., sodium acetate, sodium citrate, sodium succinate, sodium chloride, and potassium chloride. Most preferred are the alkali metal halides, e.g., sodium chloride and potassium chloride, and these are preferably present in an amount in the range of about 1 to 4 grams per 100 cc. of the medium.

Zearalenone yields and carbon source utilization appear to be improved when the initial and replacement media are sterilized by autoclaving, for example about 10 to 30 minutes for a volume up to 3 liters at about 10 to 20 p.s.i.g. of steam, prior to being inoculated.

The zearalenone recovery can be effected by any suitable procedure, for example by filtering the medium, slurrying the filter cake with an aqueous alkaline solution so as to dissolve the zearalenone, filtering the slurry, acidifying the filtrate so as to precipitate out the zearalenone, and then recovering the precipitated zearalenone, which method is described in U.S. Pat. application, Ser. No. 721,604 of Hidy and Young, filed Apr. 16, 1968, and herein incorporated by reference.

The initial pH of the fermentation medium will generally be about 6.1 to 7.2, preferably about 6.2 to 7.0. As the fermentation proceeds, the pH declines. It will usually decline to a low of, say, about 3.4 to 4.0, often about 3.6 to 3.7, within about 2 to 4 days and will continue at these pH levels for the remainder of the fermentation. If nothing is then added to the medium to adjust the pH, it will remain at that level for the duration of the fermentation period. Fortunately, relatively few contaminating organisms can multiply at pH values below about 4.

The first and subsequent replacements according to the process of the present invention are effected when at least some of the carbon source has been depleted and is preferably effected when the concentration of carbon source in the fermentation zone e.g., fermentor) has declined to about 10 percent, or less, of its original level. Using sugar, for example, it is preferred that the initial replacement of medium not be effected until the sugar concentration in the zone declines to about 3 grams per 100 cc. of medium or less. The same procedure can advantageously be followed for all of the subsequent replacements as well. Usually, it will require about 2 to 3 weeks from initiation of the process until the sugar content declines to this level. Replacement of, for example, 75% of the spent medium will usually only be followed by, say, about 7 to 10 days until the sugar content again falls that low. Thus, there is usually an initial start-up delay accompanying the production of zearalenone in the initial fermentation medium, which delay is not repeated after the replacements, thus affording a savings in time over that required for a wholly batch type operation.

Another determinant that can be used for deciding when to effect replacement is the indication that the zearalenone concentration in the fermentation zone has levelled off, for example has not exhibited any substantial increase for a period of, say, 1 to 2 days.

In each replacement operation there should be sufficient culture-containing spent medium left in the fermentation zone to effectively inoculate the replacement medium. This can usually be accomplished, for instance in a semi-continuous operation, if preferably no more than about 80 percent of the spent medium is replaced at any one time. In a continuous replacement operation, it can be advantageous to replace smaller amounts of the medium at regular intervals, e.g., from about 5 to 25 volume percent of the medium per day. Thus it will frequently be desirable to replace at least about 5 percent of the spent medium in at least one replacement operation.

It has been observed that over a period of several replacements of medium, the yields of zearalenone from the fermentation will ultimately decrease. Termination of the process should be effected, then, when the spent medium, despite consumption of most of the carbon source, has too low a concentration of zearalenone to permit economical recovery of the compound, for example, when the zearalenone concentration, despite consumption of, say, 90 percent or more of the carbon source present after the last replacement, does not rise to about 5 milligrams per milliliter of medium.

The following examples are offered to illustrate the present invention.

EXAMPLE I

Inoculum Medium

| | |
|---|---|
| Cerelose | 1.0 grams per 100 cc. |
| NZ Amine-Type A (Sheffield) | 0.2 grams per 100 cc. |
| Yeast Extract (Difco) | 0.1 grams per 100 cc. |
| Beef Extract (Difco) | 0.1 grams per 100 cc. |
| Sodium Chloride | 0.25 grams per 100 cc. |
| Distilled Water | balance |

A 100 ml. aliquot of the above inoculum medium is placed in a 500 ml. Erlenmeyer flask and autoclaved for 15 minutes at 121° C. To the cooled medium is then added 5 cc. of a mycelial suspension in the above medium of *Gibberella zeae* (Schw.) Petch strain 542 Keith ATCC 20273. The flask is then incubated at 30° C. for 20 hours on a rotary high speed shaker to yield a stage 1 inoculum. Six more 100 ml. aliquots of the inoculum medium are each autoclaved as before and then inoculated with 5 cc. of the stage 1 inoculum and incubated as in stage 1 to yield a stage 2 inoculum. Six 2,000 ml. aliquots of the inoculum medium are each placed in 6 liter inoculation flasks, autoclaved as before, and then inoculated with 100 ml. each of the stage 2 mycelium. The flasks are then incubated at 25° C. on a reciprocal shaker for 24 hours to yield a stage 3 inoculum.

Two 100 gallon fermentors are charged with 65 gallons each of the inoculum medium, brought to 90° C. by jacket heat, the volume adjusted to 55 gallons each, and the fermentors then sealed and brought rapidly to 121° C. using steam injection. The temperature is held for 15 minutes while the ingredients are air mixed. The contents are then cooled rapidly to 25° C. using jacket water. Final volume is 65 gallons each. To each of the fermentors is then added the contents of three of the stage 3 flasks. The fermentors are then maintained for 20–22 hours at 25° C. with the contents being aerated without agitation at a flow rate of 10 cubic feet per minute, the air being supplied at 10 psig head pressure.

Twelve hundred ninety-five gallons of the following fermentation medium is sterilized by being heated by steam injection to 80° C., then heated under seal to 120° C., and then immediately cooled rapidly:

FERMENTATION MEDIUM

| | |
|---|---|
| Cerelose | 33.0 grams per 100 cc. |
| KCl | 0.025 grams per 100 cc. |
| $MgSO_4 \cdot 7H_2O$ | 0.025 grams per 100 cc. |
| $K_2HPO_4$ | 0.05 grams per 100 cc. |
| Urea | 0.41 grams per 100 cc. |
| NZ Amine-Type A | 0.30 grams per 100 cc. |
| Yeast Extract (Difco) | 0.10 grams per 100 cc. |
| Distilled Water | balance |
| Antifoam | 0.06 ml. per liter |

The steam condensate provides a final volume of the thus sterilized medium of 1,370 gallons. This is placed in a 2,000 gallon fermentor and inoculated with the contents of both 100 gallon fermentors. The inoculated medium is maintained therein at 20°–22° C., agitated at a stirrer speed of 60 r.p.m., and aerated at a flow rate of 100 c.f.m., the air being supplied at 3 p.s.i.g. head pressure.

Within 2 to 3 weeks, the glucose level in the medium drops to nil and the zearalenone concentration reaches about 10 to 20 mg. per ml. Seventy-five percent of the spent medium is then removed from the fermentor for recovery of zearalenone and is replaced with a like volume of a sterilized fermentation medium having the same composition as that initially used, except for Cerelose content, which is reduced to 22 grams per 100 cc. Air flow is then reduced to 30 CFM for the next 18–24 hours in order to contain the foam head and prevent loss of medium. This same replacement procedure is repeated at 7 to 10 day intervals, when the glucose level becomes nil, for 4 or 5 cycles, until the zearalenone concentration fails to reach 10 mg./ml. The process is then terminated and the entire contents of the fermentor are harvested.

EXAMPLE II

The procedure of Example I is followed in every detail to the point of beginning replacement. At this time the continuous addition of sterile replacement medium is begun, accompanied by the continuous removal of fermentor contents at a rate equivalent to the rate of addition of replacement medium. The rate of addition and removal is adjusted to maintain the zearalenone concentration in the fermentation zone at a constant level. This is generally a replacement rate of from 0.002 to 0.008 liters per hour per liter of fermentor operating volume. In the fermentor of Example I having an operating volume of 1,500 gallons, 3 to 12 gallons per hour is removed. This replacement is continued until the rate of replacement drops below 0.002 liters per hour of operating volume.

EXAMPLE III

Essentially the same procedure and conditions employed in Example I are followed except that *Gibberella zeae* (Schw.) Petch strain Paul S. ATCC 20271 is used instead of ATCC 20273.

It is claimed:

1. In a process for the production of zearalenone by cultivation of a submergible, aerobic, zearalenone-producing strain of the microorganism *Gibberella zeae* in a fermentation zone while submerged in an agitated, aerated, aqueous, liquid phase fermentation medium containing assimilable carbon, nitrogen, and mineral sources to yield a spent fermentation medium containing recoverable zearalenone, the improvement wherein the process is conducted by replacing a portion less than all of the spent, zearalenone-containing medium with fresh fermentation medium containing assimilable carbon, nitrogen, and mineral sources, whereby the unreplaced spent medium serves as inoculum for the replacement medium.

2. The improvement of claim 1 wherein the microorganism is *Gibberella zeae* (Schw.) Petch strain 542 Keith ATCC 20273 or *Gibberella zeae* (Schw.) Petch strain Paul S. ATCC 20271.

3. The improvement of claim 2 wherein the nitrogen source is urea and the assimilable carbon source in the initial fermentation medium and a replacement medium is glucose.

4. The improvement of claim 3 wherein the initial fermentation medium contains about 20 to 40 grams of glucose per 100 cc. of medium and is retained in the fermentation zone substantially without replacement until the glucose concentration therein declines to about 3 grams or less per 100 cc. of medium.

5. The improvement of claim 3 wherein at least one partial replacement of spent fermentation medium is effected by removing about 5 to 80 volume percent of the spent medium from the fermentation zone and adding replacement medium to the zone in an amount sufficient to provide the zone's contents with about 1 to 20 grams of glucose per 100 cc. of contents in the zone.

6. The improvement of claim 3 wherein each partial replacement of spent fermentation medium is effected when the glucose concentration in the spent medium is about 3 grams or less per 100 cc. of medium.

7. The improvement of claim 6 wherein the partial replacements are continued at least so long as the zearalenone concentration in the spent medium is about 10 micrograms per milliliter of medium.

8. The improvement of claim 4 wherein the initial and replacement fermentation media contains about 0.2 to 0.8 gram of urea per 100 cc. of media.

9. The improvement of claim 9 wherein at least one batch of replacement medium contains about 10 to 30 grams of glucose per 100 cc. of medium.

10. The improvement of claim 9 wherein the initial and replacement fermentation media contain yield-enhancing amounts of hydrolyzate of casein.

11. The improvement of claim 11 wherein the mineral sources include water soluble potassium, sulfur, iron, magnesium, and phosphorus compounds.

12. The improvement of claim 11 wherein the initial and replacement fermentation media contain yield-enhancing amounts of yeast extract.

13. The improvement of claim 12 wherein the contents of the fermentation zone are maintained at about 20° to 28° C. throughout the process.

* * * * *